(12) United States Patent
Lu

(10) Patent No.: US 10,148,689 B2
(45) Date of Patent: Dec. 4, 2018

(54) METHOD AND APPARATUS FOR MONITORING MALICIOUS LINK INJECTION INTO WEBSITE SOURCE CODE

(71) Applicant: TENCENT TECHNOLOGY (SHENZHEN) COMPANY LIMITED, Shenzhen (CN)

(72) Inventor: Sixi Lu, Shenzhen (CN)

(73) Assignee: TENCENT TECHNOLOGY (SHENZHEN) COMPANY LIMITED, Guangding, Shenzhen (CN)

( * ) Notice: Subject to any disclaimer, the term of this patent is extended or adjusted under 35 U.S.C. 154(b) by 391 days.

(21) Appl. No.: 14/709,641

(22) Filed: May 12, 2015

(65) Prior Publication Data

US 2015/0244738 A1 Aug. 27, 2015

Related U.S. Application Data

(63) Continuation of application No. PCT/CN2013/086233, filed on Oct. 30, 2013.

(30) Foreign Application Priority Data

Nov. 21, 2012 (CN) .......................... 2012 1 0475499

(51) Int. Cl.
*H04L 29/06* (2006.01)
*G06F 21/56* (2013.01)
*H04L 29/08* (2006.01)

(52) U.S. Cl.
CPC .......... *H04L 63/1466* (2013.01); *G06F 21/56* (2013.01); *H04L 63/1408* (2013.01);
(Continued)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS 8,505,094 B1 * 8/2013 Xuewen .............. H04L 63/1416
707/687
2002/0010855 A1 1/2002 Reshef et al.
(Continued)

FOREIGN PATENT DOCUMENTS

CN 1866817 A 11/2006
CN 1988535 A 6/2007
(Continued)

OTHER PUBLICATIONS

"Method for Detecting Web Malicious Codes Based on Source Code Analysis", Computer & Informational Technologies, Feb. 20, 2010, pp. 49-53.
"Research on Calling an External Source File in a Webpage", Journal of North China Coal Medical College, May 10, 2004, pp. 406-407.
(Continued)

*Primary Examiner* — Sharif E Ullah
(74) *Attorney, Agent, or Firm* — Sughrue Mion, PLLC

(57) ABSTRACT

A method for monitoring malicious link injection into website source code, may include: monitoring a modification operation on a website source code file and obtaining a changed code segment; analyzing the changed code segment to extract an external link; determining whether the external link is a suspicious or malicious link; and sending an alarm message if it is determined that the external link is a suspicious or malicious link. According to the method for monitoring malicious link injection into website source code, changed content of source code can be monitored in real time, so as to effectively prevent a common type of virus transmission manner in which a malicious redirection website address is injected into page code of a legal website after a system write permission is obtained by using a vulnerability of an operating system or a third-party application. In addition, the present disclosure further provides a related apparatus.

7 Claims, 2 Drawing Sheets

(52) U.S. Cl.
CPC .......... *H04L 63/1425* (2013.01); *H04L 67/02* (2013.01); *H04L 67/18* (2013.01)

(56) References Cited

U.S. PATENT DOCUMENTS

| | | | |
|---|---|---|---|
| 2010/0017880 A1* | 1/2010 | Masood | G06F 21/51 |
| | | | 726/24 |
| 2010/0192224 A1 | 7/2010 | Ferri et al. | |
| 2011/0179430 A1* | 7/2011 | Kim | G06F 21/554 |
| | | | 719/331 |

FOREIGN PATENT DOCUMENTS

| | | |
|---|---|---|
| CN | 102402620 A | 4/2012 |
| CN | 102662840 A | 9/2012 |

OTHER PUBLICATIONS

Xing et al., "Design and Realization of System for Defending Malicious Web Pages", Computer Technology and Development, vol. 19, No. 5, May 2009, pp. 154-157.
Fengju Lang, "HTMLParser Extract Web Page Hyperlink Research", Programming Skills & Maintenance, No. 2, Jan. 18, 2010, pp. 74-75.
Office Action in CN Application No. 201210475499.2 dated Jan. 18, 2017, 8 pages.
International Preliminary Report on Patentability and Written Opinion in International Application No. PCT/CN2013/086233 dated May 26, 2015, 7 pages.
Search Report in International Application No. PCT/CN2013/086233 dated Feb. 20, 2014.
Office Action in CN Application No. 201210475499.2 dated Jun. 8, 2017, 10 pages.

* cited by examiner

METHOD AND APPARATUS FOR MONITORING MALICIOUS LINK INJECTION INTO WEBSITE SOURCE CODE

CROSS-REFERENCE TO RELATED APPLICATIONS

This is a continuation of International Patent Application No. PCT/CN2013/086233 filed Oct. 30, 2013, which claims the priority benefit of Chinese Patent Application No. CN 201210475499.2 filed Nov. 21, 2012, the entire respective disclosures of which are incorporated herein by reference.

FIELD OF THE TECHNOLOGY

The present disclosure relates to website security technologies, and in particular, to a method and an apparatus for monitoring malicious link injection into website source code.

BACKGROUND OF THE DISCLOSURE

Currently, a generally used manner of transmitting a virus is: first obtaining a system write permission by using a vulnerability of an operating system or a third-party application, and then injecting a malicious redirection website address into page code of a legal website. A current solution for detecting whether a website is infected mainly is: crawling website content externally, and then scanning page content to determine whether malicious code exists. Such methods such as a safeweb technology of the symantec and a siteadvisor technology of the McAfee are very typical.

An external detecting system based on a crawling technology has problems such as non-real-time performance, a false negative, and a false positive. A virus has a strong transmissibility, and can infect a large quantity of websites in a short time. When website content is crawled externally, all website content cannot be crawled in a short time, and therefore, security of a website cannot be detected in real time; as a result, an infected page may be incorrectly reported as still being safe due to the non-real-time performance, leading to a false positive.

A current website development manner basically is dynamically loading a large quantity of database content for a small quantity of source code. Currently, there are relatively mature solutions for security of database content, such as prevention of SQL injection and an XSS cross-site attack, but protection on source code is insufficient; and this part is also a point of attack of malicious website address injection.

SUMMARY

In view of the above, it is necessary to provide a method and an apparatus for monitoring malicious link injection into website source code, which can improve security of website source code.

A method for monitoring malicious link injection into website source code includes: monitoring a modification operation on a website source code file and obtaining a changed code segment; analyzing the changed code segment to extract an external link; determining whether the external link is a suspicious or malicious link; and sending an alarm message if it is determined that the external link is a suspicious or malicious link.

An apparatus for monitoring malicious link injection into website source code includes: a code monitoring unit, configured to monitor a modification operation on a website source code file and obtain a changed code segment; a link extracting unit, configured to analyze the changed code segment to extract an external link; a link analyzing unit, configured to determine whether the external link is a suspicious or malicious link; and a security alarm unit, configured to send an alarm message if it is determined that the external link is a suspicious or malicious link.

According to the method and the apparatus for monitoring malicious link injection into website source code, changed content of source code can be monitored in real time; and if the changed content of the source code includes some dangerous external link elements, an alarm is sent to a system administrator immediately, so as to monitor security of a website in real time, and further effectively prevent a common type of virus transmission manner in which a malicious redirection website address is injected into page code of a legal website after a system write permission is obtained by using a vulnerability of an operating system or a third-party application.

Compared with a conventional external crawling manner, real-time protection can be implemented, and transmission of a malicious link in a period when website content waits to be crawled is avoided. In addition, because website source code files are limited, and are changed less frequently, the method in embodiments has a small impact on system performance.

To make the foregoing and other objectives, features, and advantages of the present disclosure clearer and comprehensible, the following uses preferred embodiments for detailed descriptions with reference to the accompanying drawings.

DESCRIPTION OF EMBODIMENTS

To further explain the technical means used in the present disclosure for achieving the intended objectives and the effects thereof, specific implementation manners, structures, features, and effects of the present disclosure are described in detail below with reference to the accompanying drawings and preferred embodiments.

Embodiment 1

Figure 1:
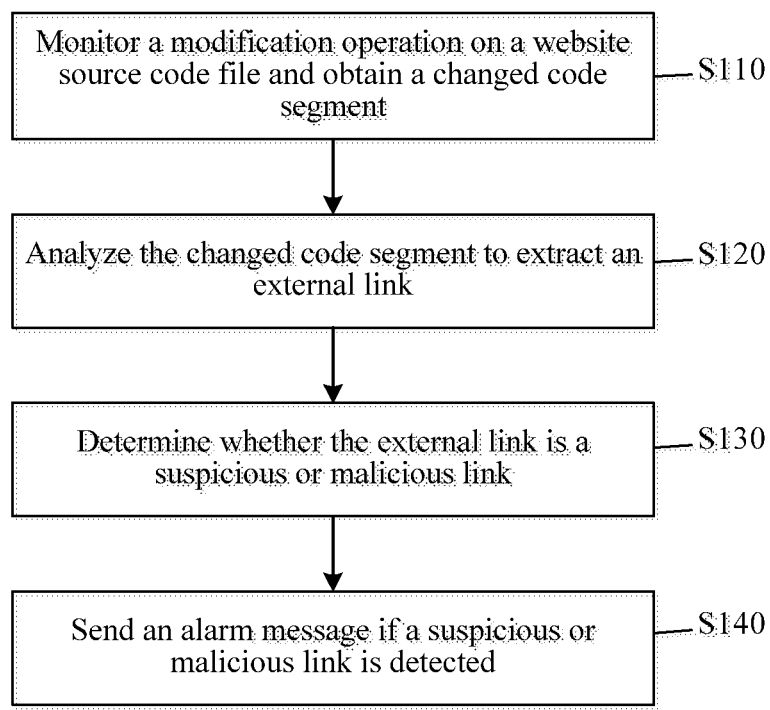
FIG. 1 is a flowchart of a method for monitoring malicious link injection into website source code according to a first embodiment.

Referring to FIG. 1, a first embodiment provides a method for monitoring malicious link injection into website source code, where the monitoring method includes:

Step S110: Monitor a modification operation on a website source code file and obtain a changed code segment.

Generally, a website source code file is stored in one or more directories. The source code file in these directories is monitored in real time and a changed code segment may be extracted when the source code file is changed. For example, first, website source code files may be backed up, and all the source code files that are backed up are indexed; modification times thereof are stored; and whether a source code file is modified can be known by comparing a modification time of the monitored source code file in the directory and a modification time of the source code file that is backed up.

Further, a changed code segment can be extracted by comparing two versions of content.

In addition, it can be understood that, monitoring of modification of a source code file is not limited to the above method. For example, a write operation of a system on a disk may be further monitored, and a changed code segment is obtained directly when a write operation on a file in a website source code directory is detected.

Step S120: Analyze the changed code segment to extract an external link.

The changed code segment may be complied and completed by using different programming languages such as HTML, Javascripts, or PHP. Because different programming languages have different grammars, analysis needs to be performed separately. Specifically, step S120, for example, may include: loading a corresponding code profiler according to a programming language used by the changed code segment; and parsing the code segment by using the code profiler, so as to extract the external link. For example, a code segment in an HTML format is loaded and analyzed by using a document object model (DOM), so as to extract an external link.

Step S130: Determine whether the external link is a suspicious or malicious link.

First, whether the external link is a suspicious or malicious link may be analyzed from the link itself and an attribute of a parent element thereof, for example, whether the external link is located in a page element having a pixel value of 0 or whether the external link is located in a page element whose coordinate location is obviously outside of a screen may be determined. Such abnormal links, that is, external links located in a page element having a pixel value of 0 or located in a page element whose coordinate location is obviously outside of a screen, may all be regarded as suspicious links.

After the suspicious link is determined, step S140 of sending an alarm message may be performed. In addition, to further determine security of the suspicious link, the suspicious link may be further sent to a third-party website address security verification service to verify whether the suspicious link is a known malicious link. For example, http://aq.qq.com/cn2/safe_school/url_query_index provides an online malicious link verification service. If it is determined that all suspicious links are secure external links, step S140 may be not performed.

In addition, besides sending the suspicious link to the third-party website address security verification service for verification, all extracted external links may be further sent to the third-party website address security verification service for verification. In this case, whether the external link is a suspicious or malicious link may be not analyzed from the link itself or the attribute of the parent element thereof, but may be verified directly online. If a result returned by the third-party website address security verification service indicates that a suspicious or malicious link exists, step S140 is performed.

Step S140: Send an alarm message if it is determined that the external link is a suspicious or malicious link.

For example, a system administrator is informed by sending an E-mail or by sending a message by using instant messaging software, so as to determine manually.

In addition, further, a protection mechanism may be further started after it is determined that the external link is a suspicious or malicious link, so as to prevent a monitored system file of source code from being deleted maliciously and a service from being uninstalled or terminated maliciously.

According to the method for monitoring malicious link injection into website source code in this embodiment, changed content of source code is monitored in real time; and if the changed content of the source code includes some dangerous external link elements, an alarm is sent to a system administrator immediately, so as to monitor security of a website in real time, and further effectively prevent a common type of virus transmission manner in which a malicious redirection website address is injected into page code of a legal website after a system write permission is obtained by using a vulnerability of an operating system or a third-party application.

Compared with a conventional external crawling manner, real-time protection can be implemented, and transmission of a malicious link in a period when website content waits to be crawled is avoided. In addition, because website source code files are limited, and are changed less frequently, the method in this embodiment has a small impact on system performance.

Embodiment 2

Figure 2:
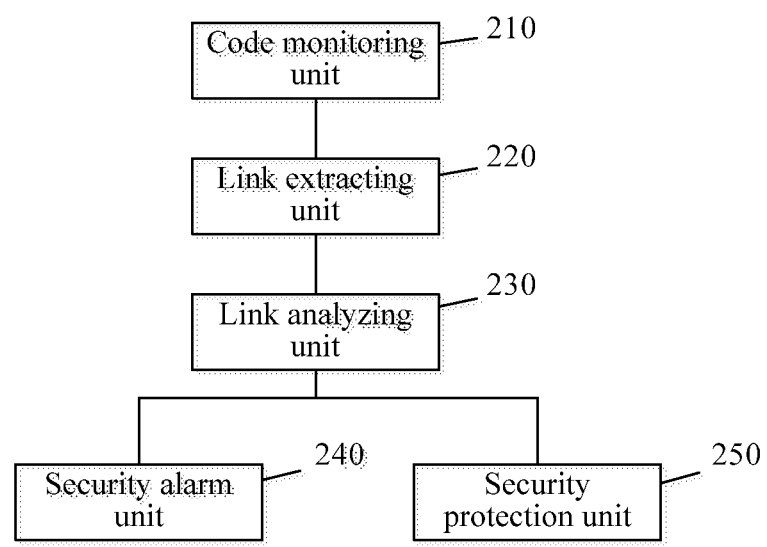
FIG. 2 is a diagram illustrating structure of an apparatus for monitoring malicious link injection into website source code according to a second embodiment.

Referring to FIG. 2, a second embodiment of the present invention provides an apparatus 200 for monitoring malicious link injection into website source code, including: a code monitoring unit 210, a link extracting unit 220, a link analyzing unit 230, and a security alarm unit 240.

The code monitoring unit 210 is configured to monitor a modification operation on a website source code file and obtain a changed code segment. Generally, a website source code file is stored in one or more directories. The source code file in these directories is monitored in real time and a changed code segment may be extracted when the source code file is changed. For example, first, website source code files may be backed up, and all the source code files that are backed up are indexed; modification times thereof are stored; and whether a source code file is modified can be known by comparing a modification time of the monitored source code file in the directory and a modification time of the source code file that is backed up. Further, a changed code segment can be extracted by comparing two versions of content.

In addition, it can be understood that, monitoring of modification of a source code file is not limited to the above method. For example, a write operation of a system on a disk may be further monitored, and a changed code segment is obtained directly when a write operation on a file in a website source code directory is detected.

The link extracting unit 220 is configured to analyze the changed code segment to extract an external link. The changed code segment may be complied and completed by using different programming languages such as HTML, Javascripts, or PHP. Because different programming languages have different grammars, analysis needs to be performed separately. Specifically, the link extracting unit 220 may be configured to load a corresponding code profiler according to a programming language used by the changed code segment; and parse the code segment using the code profiler, so as to extract the external link. For example, a code segment in an HTML format is loaded and analyzed by using a DOM, so as to extract an external link.

The link analyzing unit 230 is configured to determine whether the external link is a suspicious or malicious link. First, whether the external link is a suspicious or malicious link may be analyzed from the link itself and an attribute of a parent element thereof, for example, whether the external link is located in a page element having a pixel value of 0 or whether the external link is located in a page element whose coordinate location is obviously outside of a screen may be determined. Such abnormal links, that is, external links located in a page element having a pixel value of 0 or located in a page element whose coordinate location is obviously outside of a screen, may all be regarded as suspicious links.

After the suspicious link is determined, information relative to the suspicious link may be sent to the security alarm unit 240, and an alarm message is sent by the security alarm unit. In addition, to further determine security of the suspicious link, the suspicious link may be further sent to a third-party website address security verification service to verify whether the suspicious link is a known malicious link. For example, http://aq.qq.com/cn2/safe_school/url_query_index provides an online malicious link verification service. If it is determined that all suspicious links are secure external links, the security alarm unit 240 may be not invoked.

In addition, besides sending the suspicious link to the third-party website address security verification service for verification, the link analyzing unit 230 may further send all extracted external links to the third-party website address security verification service for verification. In this case, whether the external link is a malicious link may be not analyzed from the link itself or the attribute of the parent element thereof, but may be verified directly online. If a result returned by the third-party website address security verification service indicates that a suspicious or malicious link exists, the suspicious or malicious link is sent to the security alarm unit 240.

The security alarm unit 240 is configured to send an alarm message if it is determined that the external link is a suspicious or malicious link. For example, a system administrator is informed by sending an E-mail or by sending a message by using instant messaging software, so as to determine manually.

In addition, the monitoring apparatus 200 may further include a security protection unit 250, configured to start a protection mechanism after it is determined that the external link is a suspicious or malicious link, so as to prevent the monitoring apparatus 200 from being deleted maliciously and a service from being uninstalled or terminated maliciously. For example, the security protection unit 250 may be loaded in an operating system in the form of a driving service, and monitors and intercepts operations of external programs on function modules of the monitoring apparatus 200, so as to prevent the monitoring apparatus 200 from being deleted maliciously, and a service from being uninstalled or terminated maliciously.

The apparatus for monitoring malicious link injection into website source code in this embodiment monitors changed content of source code in real time; and if the changed content of the source code includes some dangerous external link elements, sends an alarm to a system administrator immediately, so as to monitor security of a website in real time, and further effectively prevent a common type of virus transmission manner in which a malicious redirection website address is injected into page code of a legal website after a system write permission is obtained by using a vulnerability of an operating system or a third-party application.

Compared with a conventional external crawling manner, real-time protection can be implemented, and transmission of a malicious link in a period when website content waits to be crawled is avoided. In addition, because website source code files are limited, and are changed less frequently, the method in this embodiment has a small impact on system performance.

In addition, an embodiment of the present invention further provides a computer readable storage medium, in which a computer executable instruction is stored, and the computer readable storage medium, for example, is a non-volatile memory such as an optical disc, a hard disk, or a flash memory. The computer executable instruction is used to enable a computer or a similar computing apparatus to complete operations of the method for monitoring malicious link injection into website source code.

The foregoing descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for monitoring malicious link injection into website source code, performed by a processor executing instructions stored in a memory, the method comprising:
   monitoring in real-time a plurality of website source code files that are stored in a directory to identify a change to a website source code file and obtaining a changed code segment;
   loading a code profiler corresponding to a programming language of the changed code segment and parsing the changed code segment using the code profiler to extract an external link;
   determining whether the external link is a suspicious or malicious link by transmitting the external link to a verification service, and receiving a result indicating whether the external link is a suspicious or malicious link; and
   sending an alarm message and starting a protection mechanism if the result indicates that the external link is a suspicious or malicious link,
   wherein the monitoring comprises:
   backing up the plurality of website source code files;
   storing modification times of the backed up website source code files;
   comparing a current modification time with the stored modification times to identify the change to the website source code file, and
   comparing a backed up version and a current version of the identified website source code file to obtain the changed code segment.

2. The method according to claim 1, further comprising:
   starting a protection mechanism after it is determined that the external link is a suspicious or malicious link, so as to prevent a system file from being deleted maliciously and a service from being uninstalled or terminated maliciously.

3. The method according to claim 1, wherein the determining whether the external link is a suspicious or malicious link comprises:

determining, according to whether the external link is a link located in a page element having a pixel value of 0, or a link composed in a page element whose coordinate location is obviously outside a screen, whether external link is a suspicious or malicious link.

4. An apparatus for monitoring malicious link injection into website source code, the apparatus comprising a memory and a processor communicating with the memory, the memory storing instructions that when executed by the processor configure the apparatus to:

monitor in real-time a plurality of website source code files that are stored in a directory to identify a change to a website source code file and obtain a changed code segment;

load a code profiler corresponding to a programming language of the changed code segment and parse the changed code segment using the code profiler to extract an external link;

determine whether the external link is a suspicious or malicious link by transmitting the external link to a verification service, and receiving a result indicating whether the external link is a suspicious or malicious link; and send an alarm message and starting a protection mechanism if it the result indicates that the external link is a suspicious or malicious link, wherein to monitor the plurality of website source code files, the instructions are further configured to:

back up the plurality of website source code files;

store modification times of the backed up website source code files;

compare a current modification time with the stored modification times to identify the change to the website source code file, and compare a backed up version and a current version of the identified website source code file to obtain the changed code segment.

5. The apparatus for monitoring malicious link injection into website source code according to claim 4, wherein the instructions are further configured to start a protection mechanism after it is determined that the external link is a suspicious or malicious link, so as to prevent a system file from being deleted maliciously and a service from being uninstalled or terminated maliciously.

6. The apparatus for monitoring malicious link injection into website source code according to claim 4, wherein the instructions are further configured to: determine, according to whether the external link is a link located in a page element having a pixel value of 0, or a link comprised in a page element whose coordinate location is obviously outside of a screen, whether the external link is a suspicious or malicious link.

7. A non-transitory computer readable storage medium having stored therein one or more instructions, which, when executed by a computing device, cause the computing device to:

monitor in real-time a change to a website source code file a plurality of website source code files that are stored in a directory to identify and obtain a changed code segment;

loading a code profiler corresponding to a programming language of the changed code segment and parsing the changed code segment using the code profiler to extract an external link;

determine whether the external link is a suspicious or malicious link by transmitting the external link to a verification service, and receiving a result indicating whether the external link is a suspicious or malicious link; and send an alarm message and starting a protection mechanism if the result indicates that the external link is a suspicious or malicious link, wherein to monitor the plurality of website source code files, the instructions are further configured to:

back up the plurality of website source code files;

store modification times of the backed up website source code files;

compare a current modification time with the stored modification times to identify the change to the website source code file, and compare a backed up version and a current version of the identified website source code file to obtain the changed code segment.

* * * * *